Patented Dec. 17, 1935

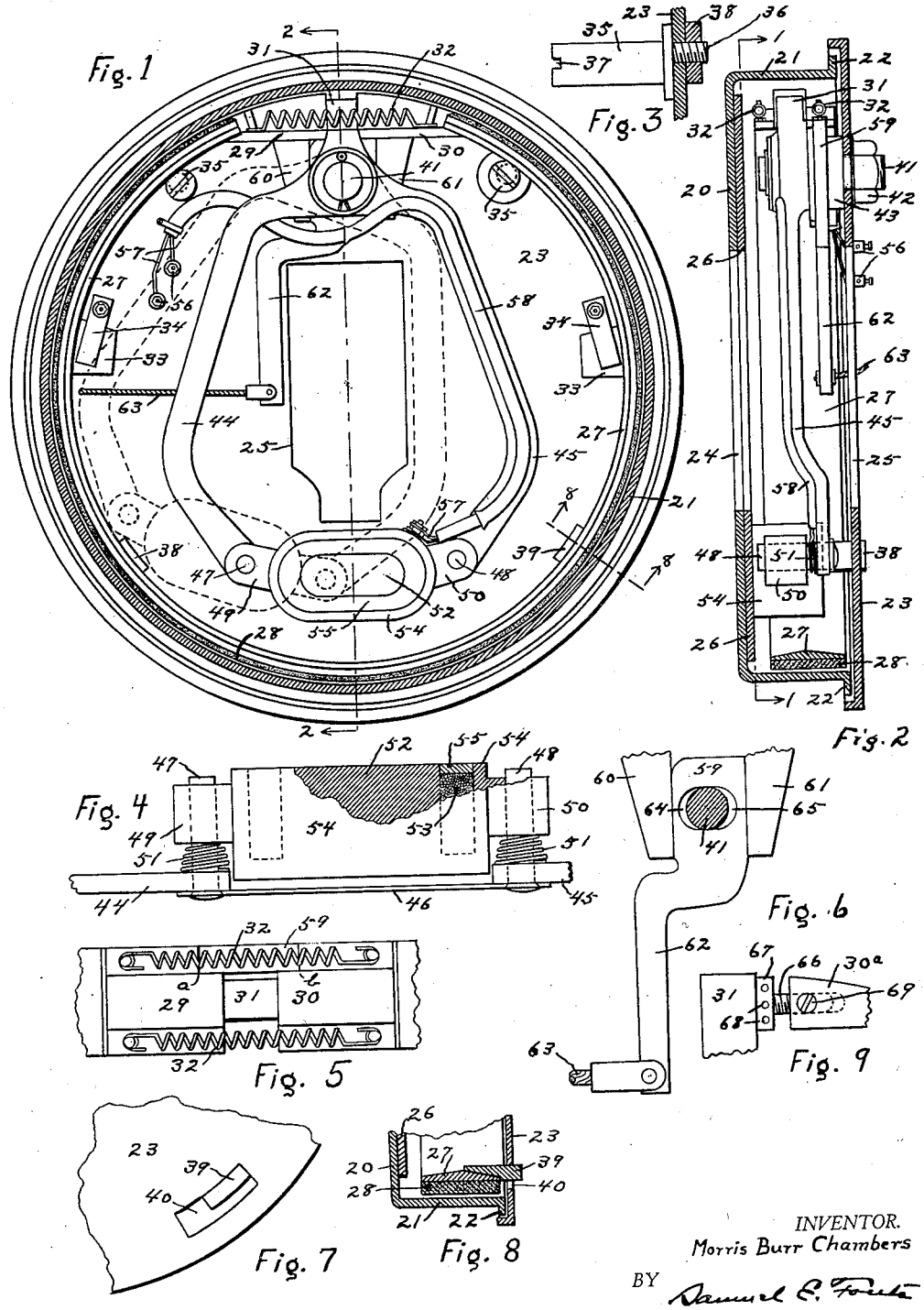

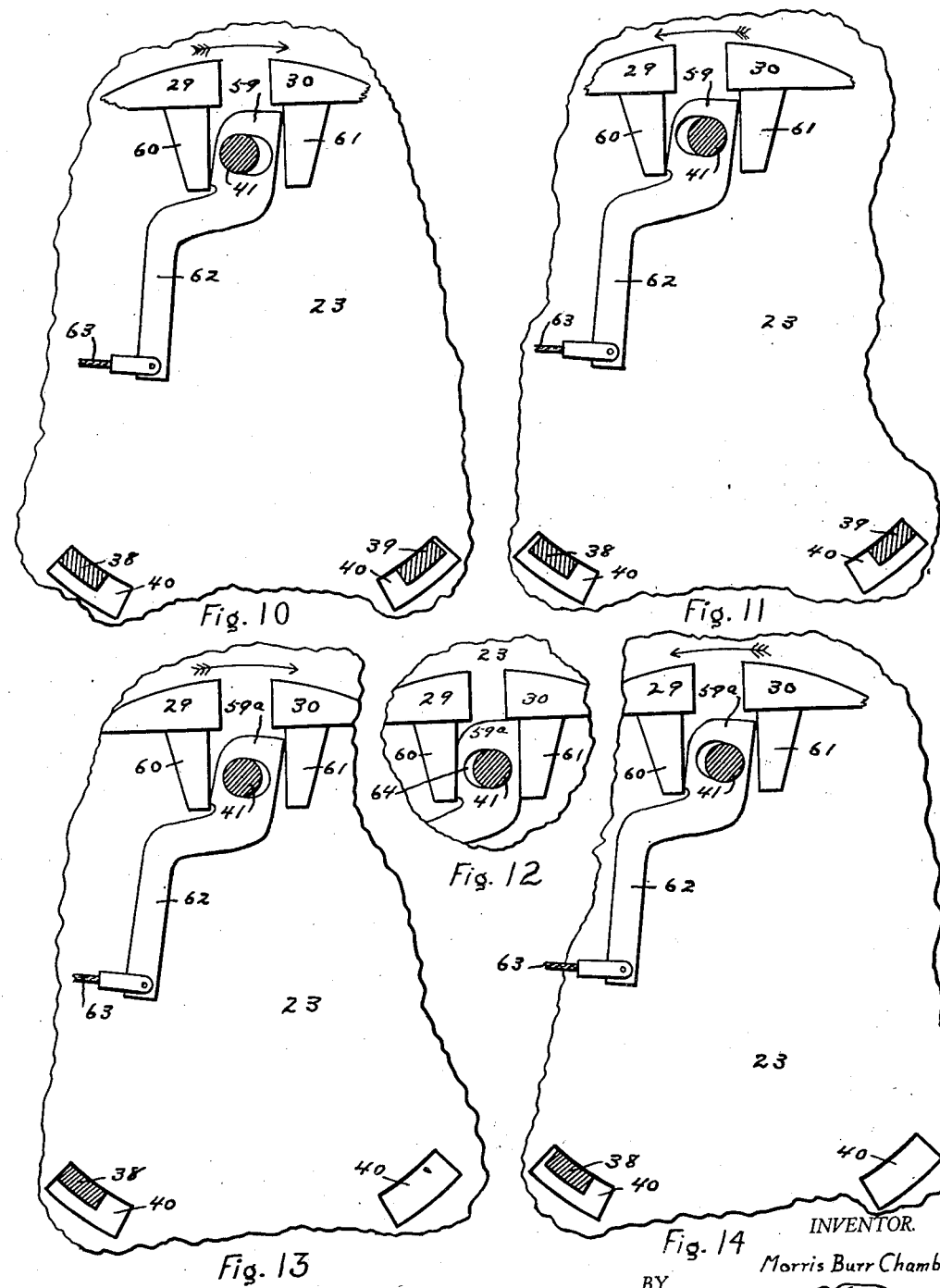

2,024,847

UNITED STATES PATENT OFFICE 2,024,847

BRAKE

Morris Burr Chambers, Los Angeles, Calif.

Application August 28, 1933, Serial No. 687,029

14 Claims. (Cl. 188—140)

This invention relates to brakes, and particularly to electro-magnetic brakes for automotive vehicles, the same being an improvement on the brake disclosed in my pending application filed March 5, 1932, Serial No. 596,957, the general objects of my present invention being to simplify, cheapen, strengthen and render more efficient the said brake. The specific means by which these and other objects are attained will be fully set forth herein. However, I desire it to be understood that the details of structure disclosed in this specification and in the accompanying drawings are illustrative only and that the appended claims are not intended to be restricted thereto any farther than their specific terms render necessary.

In the drawings, Fig. 1 is a sectional view taken vertically through the brake-drum on the line 1—1 of Fig. 2, the brake-band and its operating mechanisms appearing in elevation; Fig. 2 is a sectional view taken vertically through the brake and band on the line 2—2 of Fig. 1, the said operating mechanisms again being shown in elevation; Fig. 3 shows one of the eccentric guides by means of which the brake-band may be adjusted in its relation to the drum; Fig. 4 is a view, partly in section and partly in elevation, of the activating magnet and its supporting means, said view being taken from below the magnet; Fig. 5 is a fragmentary view, in plan, of the ends of the brake-band and the springs for drawing them toward each other; Fig. 6 shows the manually operated cam and lever and portions of the lugs on the brake-band which are engaged by the cam to spread the band; Fig. 7 is a rear elevation of a portion of the back-plate showing one of the anchors for the brake-band; Fig. 8 is a sectional view through one of the anchors, as on the line 8—8 of Fig. 1; Fig. 9 shows a modified structure in which the brake-band is provided with an adjusting screw for contact with the operating cam; Fig. 10 shows the cam and lever of Fig. 6, the brake-shoes with their lugs for engagement by the cam, a portion of the back-plate, the anchoring means for the brake-band and the position the ends of the band assume when the drum is turning clockwise and the cam is operated; Fig. 11 shows the same parts and the positions they assume when the drum is turning anti-clockwise; Figs. 12, 13 and 14 are views similar to Figs. 6, 10 and 11, respectively, but showing a modified structure.

While the invention is applicable to various rotating parts, it is herein disclosed as a brake for the wheel of an automotive vehicle. In the drawings, the wheel is not shown, but it will be understood that the brake-drum, 20, is attached to the wheel which, in Fig. 2, would be at the left-hand side of the drum. The latter is provided with a peripheral flange, 21, and it, in turn, has a short outurned flange, 22, which rotates with the wheel in close proximity to the back-plate 23. As will be understood, the drum and back-plate provide a chamber within which the operating parts of the brake are housed. This chamber surrounds the car axle, not shown but which extends through openings 24 and 25 in the drum and back-plate, respectively. Rigidly attached to the drum and coaxial therewith is an annular plate 26, of suitable magnetic material, for a purpose hereinafter explained.

Within the chamber formed by the back-plate and drum and closely adjacent the inner surface of the flange 21, is the brake-band 27 with its lining 28. The band extends almost completely about within the flange, but is split at one point and its ends provided with the brake shoes 29 and 30 which are held in spaced relation by a cam 31. Springs 32, attached to the shoes and spanning the gap between them, normally hold the shoes in contact with the cam, as is shown most clearly in Fig. 5. The band is held in proper position with respect of the back-plate by lugs 33 which lie against the back-plate and are so held by clips 34 which are bolted or otherwise secured to the said plate and overlie the lugs. As many of these lugs and clips are employed as may be necessary to hold the brake-band properly positioned, Fig. 1 showing two. To accommodate brake-linings of different thicknesses or to adjust the same for wear, the brake-band is rested, adjacent its ends and elsewhere if found desirable, upon pins 35. As shown in Fig. 3, these pins are each supported upon the back-plate 23 by a stud-bolt 36 integral with the respective pin but eccentric thereto. The pin is provided with a groove 37 for a screw-driver and, by turning it more or less, the brake-band is adjusted with reference to the flange 21 of the brake-drum. A nut 38 on the stud-bolt may then be tightened against the back-plate to hold the pin in its adjusted position.

As will be understood, if the drum be rotating and the brake-band be spread until the lining thereon contacts with the drum-flange, that end of the lining which is in advance of the spreading device will seize the flange and will tend to move with it while the opposite or following end will have little or no such tendency. That is to say, if the drum be turning anti-clockwise in Fig. 1 and the brake-band be spread, the lining at the shoe 29 will seize the drum-flange and will move with it as far as permitted, while the lining at the shoe 30 will not seize the flange and, consequently, will have little tendency to move. If, now, the band be anchored only at the end which carries the shoe 30, the band will be spread from end to end and a full-wrap will result. This gives too vigorous a braking action for the average operator. As in the brake disclosed in my said application, I anchor the band intermediate its ends, so that that part between one of the ends and the anchor will be operative for braking when the drum is rotating in one direction and that part between the other end and the anchor will be operative when the drum is rotating in the opposite direction. If a half wrap of the band is desired for braking in both directions of rotation of the drum, a single anchor midway between the ends of the band would be employed. But usually, and as shown, I anchor the band at two points intermediate the ends and so locate those anchors as to obtain the braking action which is best suited to the particular vehicle whether the drum be turning forwardly or in reverse. In Fig. 1, a part of each of the anchoring means is shown at 38 and 39, respectively, suitable positions of the anchors being thus indicated. The preferred structure of the anchoring means is best seen in Figs. 7 and 8. The part 39 is a member which is welded, brazed or otherwise suitably secured to the brake-band 27 and is projected outwardly through an elongated slot 40 in the back-plate. When the brake is fully released and the parts are all in their normal positions, as shown in Fig. 1, the members 38 and 39 are in the far ends of their slots, or farthest from the vertical center-line of the drum. Fig. 7 shows this position of the member 39. If, now, the drum be rotating anti-clockwise, in Fig. 1, and the band be spread, the band will be anchored by the member 39 only, since the member 38 may move somewhat in its slot. This condition is illustrated in Fig. 11. If, however, the drum be rotating clockwise, the anchor members will take the positions indicated in Fig. 10. With the members located as shown, the brake-band will wrap approximately 30° more than a half-turn, or about 210°, whether the drum be turning in one direction or the other. The positions of the slots 40 in the back-plate will depend upon the braking action desired for each vehicle which, in turn, will depend upon the weight and expected speed of the vehicle, or upon the expected momentum to be attained. Since the speed and momentum is generally greater when the car is moving forwardly than when in reverse, the slots and anchoring elements may be arranged to provide a greater wrap for the forward movement. As will be seen hereafter, however, there may be conditions which call for a greater wrap for the reverse movement. The locations of the slots and anchoring members depend upon conditions which vary with the vehicles and their uses, and they will be so placed as best to satisfy those conditions. Generally, the brakes will be applied by the manufacturers of the vehicles each of whom makes a number of styles, sizes and weights of vehicles, some for slow and some for rapid traffic. In other words, as a general thing each vehicle manufacturer turns out machines which are expected to have different momenta when in use. For vehicles having a certain expected momentum the slots and anchoring members will be located in positions which would prove unsatisfactory for his other vehicles having different momenta. When my brake is to be substituted for one on a used vehicle, the slots 40 would be formed just where the desired anchors should be located in order to obtain the best braking action for that vehicle.

The cam 31 may be swung to the right or left by various suitable means; but, because of its simplicity, ease of assembly and operation, dependability and adaptability for substitution in old brake structures, I prefer the electromagnetic means shown. The cam is one of three arms of a member which is pivoted on a stud-bolt or pin, 41, which projects through the back-plate and is secured thereto by a nut 42 which clamps the back-plate between itself and a flange 43 on the bolt. The other two arms fork out from the hub of the member and extend outwardly and downwardly, as shown in Fig. 1, the arms being designated 44 and 45. The two arms and the cam are preferably in a single piece and constitute a forked lever which is fulcrumed on the bolt or pin 41. The arms 44 and 45 are curved divergently and are spaced from the axle (which is not shown but which extends through the openings 24 and 25 of the drum and back-plate) sufficiently to permit them to swing without interference. As will be seen from Fig. 4, the free ends of these arms are rigidly connected by a plate 46, which is attached to the arms by pins 47 and 48. These pins project toward the brake-drum, or the annular plate 35 thereon, to form guides for the ears 49 and 50, respectively, of the magnet. Surrounding the pins between the arms and the respective ears are light coiled springs 51 for urging the magnet toward the said plate 26 and causing it to bear lightly against the latter. The magnet is approximately ellipsoidal in shape, by preference and as shown. It has a central core or pole 52 which is surrounded by a magnet winding 53, outside of which is a relatively thin wall, 54, which forms the outer pole piece. The magnetizable parts of the magnet are preferably in a single piece, as shown, and the winding is set in a deep groove in the forward face, being held in position in any suitable manner, as by a ring 55 of non-magnetic material. Beyond the bottom of the groove sufficient material is left to carry the magnetic flux from pole to pole.

Current for the magnet may be derived from any suitable source, as from the battery which feeds the ignition and lighting circuits, and it is led to suitable binding-posts, 56, on the back-plate, and thence to the magnet winding through conductors 57, the latter being preferably encased in an insulating tube 58 which is mounted on one of the arms, as 45, of the operating member or lever. A suitable switch and rheostat, not shown, are provided for turning on and off the current and for regulating its strength, as will be understood.

The operation of those parts of the invention which have been described is as follows: Assuming the drum in Fig. 1 to be turning anti-clockwise and the current to the winding 53 to be switched on, the magnet will be energized and will be attracted to the annular plate 26 with which it is already in light contact because of the spring 51. The said plate thus forms the armature of the magnet and the latter is carried about with the plate, thus swinging the lever, which is made up of the arms 44 and 45 and the cam 31, in an anti-clockwise direction. This causes the cam to push the shoe 29 of the brake-band to the left, with the result that the left-hand end of the lining 28 is seized by the drum flange 21. The circumferential movement of the band is greatest at the shoe 29, is nil at the anchor 39, and is very slight at the anchor 38. However, the latter anchor does not interfere with the movement of the band in the direction in which the drum is now assumed to be turning, and all of the lining from the end at the shoe 29 to the anchor 39 is forced into braking contact with the drum flange. The tenacity with which the brake will be set depends, of course, upon the strength of the energizing current. Unless the latter is so strong as to stop the rotation of the wheel instantly, the magnet will slip over the annular plate while, at the same time, it is attracted to it. As a practical matter, the current is applied first weakly and then gradually strengthened so that the drum and vehicle are brought to an easy stop or to a gentle check, as may be desired.

As will be noted, while the cam 31 is moving toward the shoe 29 it is receding from the shoe 30. This is an important feature of my invention, for the reason that, if the shoe 30 were held by the cam or otherwise and the anchor 39 were to permit almost any perceptible movement of the band at that point of anchorage, then the band would be anchored at its end only and a full-wrap and too vigorous action of the brake would result. In a structure in which the band is held from movement at what may be termed its receding or following end, it is only by the most exact adjustment of the intermediate anchors that they can be made to function properly and thus prevent a full-wrap of the band. Hence, it is important to have the cam 31 recede from the following end of the band in order that the intermediate anchors may surely be effective.

When the drum is turning in the direction opposite to that we have assumed, the movement of the parts is the reverse of that described but is otherwise the same. It is deemed unnecessary, therefore, to describe the operation under these reversed conditions further than to say that the anchor 38 now becomes active and the anchor 39 idle, while the cam recedes from the shoe 29, thus insuring the proper functioning of the anchor 38. In Fig. 1, the magnet and its supporting means are shown in dotted lines in the positions they assume when the drum is turning clockwise and the magnet is energized. As will be understood, when the drum is turning in the opposite direction and the magnet is energized, these parts will be swung to the right from the full-line or normal position shown.

The brake, operated as described, is for service on the road. Clearly, it would be impractical and inefficient for parking purposes, since the battery would soon become exhausted and the brake would fail to function. I have, therefore, provided a mechanical and manually-operated means for expanding the brake-band 27. Looking at Fig. 5, it will be seen that the brake shoes 29 and 30 are, for the greater part of their width normally spaced apart only sufficiently to receive the cam 31 with which they are in contact. Beyond, or at the right of the cam as viewed in Fig. 2, the space between the shoes widens to receive a second cam, 59, which I shall term the parking cam. This widened part of the space extends between the lines $a$ and $b$ of Fig. 5. The cam 59 is shown in its normal position in Fig. 6. It is supported by and is pivoted upon the pin 41. Each of the shoes 29 and 30 is provided with rigid and downwardly extending lugs, 60 and 61, respectively, which are drawn toward each other by the springs 32 until they normally abut the parallel sides of the cam 59, as in Fig. 6. The cam and the lugs extend both above and below the pin 41. Below the pin, the cam is provided with an operating lever 62 through which it may be rocked on its pivot, the lever being bent so as to clear the axle through the openings 24 and 25. In the drawings the lever is shown bent to the left although it may as well be bent to the right. To its lower end I pivotally connect a cable 63, which is extended adjacent the back plate and is then passed through the latter to be connected with any suitable operating member, such as the usual emergency-brake lever of the vehicle.

As will be seen from Fig. 6, the opening through the cam 59 for the pin 41 is elongated to form an approximately elliptical slot so that, when the cam is in its normal position, a crescent-shaped space 64—65 is provided at the left and right, respectively, of the pin. Further, as will be noted from Fig. 1, the operating lever 62 is extended downwardly to the left of the opening 25 so as to be spaced from the axle. This space and the elongated opening through the cam make it possible to shift the cam bodily without interference. This is an important feature of the invention for reasons which have been partially explained. If the cam were held rigidly in the position of Fig. 6, it would form an anchor for the ends of the brake-band and a full-wrap of the band would be difficult to avoid and could be prevented only by the most exact positioning and fitting of the anchor members 38 and 39 in their slots 40. Even then, the wear of the brake-lining would be liable so to disturb the adjustment as to result in a full-wrap of the band. However, in my invention, if the drum of Fig. 1 be turning clockwise and the cam 31 be moved to the right to set the brake, the cam moves away from the shoe 29. If the anchor member 38 were badly fitted in its slot 40 so that the entire brake-band could shift, the lug 60 on the shoe 29 would simply push the parking cam 59 to the right, such movement being possible because of the space 64 at the left of the pivot pin and of the space between the operating lever 62 and the axle. Before either of these spaces could be taken up the anchor 38 would have become operative. If the drum be turning in the anti-clockwise direction, the parking cam can shift to the left (Fig. 6) to take up the space 65 or such part of it as may be required to cause the anchor member 39 to hold the band. Thus, the parking cam is prevented from anchoring the ends of the brake-band when the service cam 31 is used to set the brake.

But the elongated slot in the cam 59 has its advantages when that cam is used either for parking or for spreading the band to stop or check the vehicle. Figs. 10 and 11 show the same elements as Fig. 6 and, in addition, the anchor members 38 and 39 in their slots 40. In Fig. 10 the drum is supposed to be turning in the direction indicated by the arrow, and the parking cam has been operated. If the drum had not been turning, the shoes 29 and 30 would have been moved to the left and right, respectively, equal distances and the pin 41 would have remained at the center of the opening in the cam, as in Fig. 6. But under the assumed conditions, the shoe 30 moves to the right as the band expands, the anchor member 38 holding the latter from circumferential movement. In the meanwhile, the lug 60 on the shoe 29 acts as a fulcrum for the lever and the cam rocks about its lower, left-hand corner until the pin 41 may occupy the left-hand end of the cam-slot, as shown. Of course, the lever 62 may not be moved to the extent indicated in Fig. 10, in which case the pin would not rest in the extreme end of the slot. But in all cases, the elongated slot permits the cam to shift on its pin and assures that the anchor member 38 functions as intended. In Fig. 11, the arrow indicates the rotation of the drum anti-clockwise, and the drawings show the positions which the parts assume. It will be noted that the cam 59 has shifted to the left and that the anchor member 39 has engaged the end of its slot. Due to its elongated slot, the cam 59 with its manual-operated means is admirably adapted to control the vehicle when in motion if the electro-magnetic means should, for any reason, become inoperative.

In some circumstances, such as in the operation of heavy vehicles on steep grades, it may be desirable to employ a full-wrap of the band for parking or holding the car, while a partial wrap only is best for checking it while running. Such vehicles may be equipped as shown in Figs. 12, 13 and 14, in which Fig. 12 shows the normal position of the cam, here designated 59ᵃ. The only difference between the cams 59 and 59ᵃ lies in the slot for the pivot pin 41. In 59ᵃ, the elongation of the slot is on one side only of the pin, corresponding to the space 64 of Fig. 6. The total elongation of the slot is only half that of the cam 59. When the drum is turning clockwise and the cam-lever 62 is rocked, as shown in Fig. 13, the cam 59ᵃ shifts, as in Fig. 10, to allow the anchor-member 38 to become operative, thus obtaining a wrap from the end of the band at the shoe 30 to the member 38. When the drum is reversed, however, as indicated in Fig. 14, the cam 59ᵃ cannot shift on the pivot pin 41 to the left, as in Fig. 11, because the pin slot has no space corresponding to the space 65 of Fig. 6. Consequently, the shoe 30 is anchored by the cam 59ᵃ and is even pushed to the right as the cam is rocked. In this structure the anchoring member 39 is omitted, so that the band is expanded into braking relation throughout its full length.

I have described the eccentrically-mounted pin 37 of Fig. 3 as a means for adjusting the brake-band. A further adjustment for the band is shown in Fig. 9, in which the cam 31 appears in its normal position. 30ᵃ indicates the right-hand shoe, corresponding to the shoe 30 of Fig. 1. This shoe, 30ᵃ, is not engaged directly by the cam, but is provided with a screw 66 having a head 67 for contacting the cam. This screwhead is provided with radial holes or sockets 68 for turning the screw. By adjusting the latter in or out of the shoe, any lost motion or looseness due to wear may be taken up. When satisfactory adjustment has been made, the screw may be locked by a set screw 69. While Fig. 6 shows but a portion of one shoe and its adjusting screw, it will be understood that the opposite shoe will be furnished with a similar screw to engage the cam 31.

I claim:

1. A brake comprising a rotatable drum having a flange thereon, a non-rotatable back-plate, said back-plate and flanged drum forming a housing, a split brake-band within the housing and closely adjacent the said flange, a lever pivoted intermediate its ends upon the back-plate and having one of its ends projected between the ends of the brake-band, the other end of the lever being comprised of two divergently-spaced arms which extend on opposite sides of the axial center of the drum, an electro-magnet mounted on the said two arms, a winding and electric connections for said magnet whereby the latter may be energized, the pole-faces of the magnet being in close proximity to the said drum so that the drum forms an armature for the magnet whereby, when the drum is turning and the magnet is energized, the arms will be swung upon the lever pivot and that end of the lever which projects between the ends of the brake-band will expand the latter into braking relation with the drum flange.

2. A brake as set forth in claim 1 in which the electro-magnet is slidably mounted upon the said two arms of the lever, and resilient means for holding the pole-faces of the magnet in contact with the drum.

3. A brake as set forth in claim 1 having means for anchoring the brake-band to the back-plate intermediate the ends of the band.

4. A brake comprising a rotatable brake-drum, a non-rotatable member, a pivot-pin on said member, a split brake-band, a cam having an elongated slot therein through which said pivot-pin extends, said slot permitting the cam to shift transversely upon the pin, means connected with said cam for rocking it upon said pin to force the ends of the split brake-band into braking relation with the drum, and means for anchoring the band intermediate its ends to the non-rotatable member, the relation of parts being such that if the anchoring means permits a slight circumferential movement of the brake-band the cam will shift on its pivot pin thus to assure the arrest of the band by the anchoring means only.

5. A brake as set forth in claim 4 in which the anchoring means comprises a pair of spaced members rigidly projected from the brake-band on opposite sides of the mid-length point of the brake-band and loosely engaged with the back-plate.

6. A brake comprising a rotatable and circularly-flanged brake-drum, a non-rotatable and slotted back-plate, a pin projecting from the back-plate, a split brake-band within the flange of the drum, a cam having an elongated opening through which said pin extends, whereby the cam may rock upon said pin as a pivot and may shift transversely thereon, said cam cooperating with the ends of the brake-band to expand the latter when the cam is rocked, means for rocking the cam, a pair of anchoring members rigidly projected from the brake-band and extended laterally into slots in the back-plate, the said members and the respective slots being on opposite sides of the mid-length point of the brake-band with the members normally in those ends of their respective slots which are farthest from said mid-length point, as and for the purpose specified.

7. A brake comprising a rotatable and circularly-flanged drum, a non-rotatable back-plate, a pin projecting from the back-plate parallel to but out of alinement with the axial center of the drum, a split brake-band within the flange of the drum, a brake-shoe for and attached to each end of the band, a lever pivoted upon said pin and having one of its ends projected between the said shoes, means connected with the other end of the lever and adapted to swing it upon said pin to either side of its central and normal position, thus to expand the brake-band at either of its ends into braking relation with the drum-flange, a cam pivoted upon said pin and having an elongated opening through which the pin extends, said cam being between the said shoes and adapted when rocked to expand the band at either of its ends, means for rocking said cam upon the said pin as a pivot, the elongated opening in the cam permitting it to shift transversely on the pin, and means for anchoring the brake-band intermediate its ends to the back-plate.

8. A brake as set forth in claim 7 in which which the means connected with the lever and adapted to swing it upon the pivot pin is an electro-magnet and means whereby it may be energized, said magnet having its pole faces so disposed with reference to the drum that the latter serves as an armature for the magnet and when the drum is turning and the magnet is energized the latter is carried about the pivot-pin as a center and the lever is thus rocked to set the brake.

9. A brake as set forth in claim 7 in which the back-plate is provided with a slot on each side of the mid-length point of the brake-band and in which the means for anchoring the band to the plate comprises a pair of members rigidly projected from the band and extended into the respective slots in the back-plate.

10. A brake comprising a rotatable drum, a split brake-band within said drum, a cam projected between the ends of the band and normally in engagement with both of said ends, means for impelling the ends of the band toward the said cam, the oppositely-faced engaging surfaces of the cam being substantially symmetrical in contour whereby any movement of the cam toward one end of the band moves that end to substantially the same extent that an equal movement of the cam toward the other end of the band would move that end, means for moving said cam toward either end of the band, and anchoring means for the band intermediate its ends, the construction being such that when the cam is moved toward one end of the band the other end is held against movement by the anchoring means alone and the cam recedes from the said other end.

11. A brake comprising a rotatable drum and a non-rotatable member, a split brake-band within said drum, a lever pivoted intermediate its ends on said member and having one of its ends projecting from its pivot between the ends of the brake-band and serving as a cam to expand the band when the said lever is rocked, the opposite active faces of the cam being substantially symmetrical in contour so that when the cam is rocked to any degree toward one end of the band it moves that end to substantially the same extent as would the other end be moved if the cam were rocked to the same degree toward it, means for impelling the ends of the band toward said cam and for normally holding said ends in contact therewith, means whereby the lever may be swung to move the cam toward either end of the brake band, and means intermediate the ends of the band and coacting with the non-rotatable member for anchoring the band, the construction being such that when the cam is moved toward one end of the band the other end of the latter is held against movement by the anchoring means alone and the cam recedes from the said other end.

12. A brake as set forth in claim 11 in which the means whereby the lever may be swung is within the brake drum.

13. A brake as set forth in claim 11 in which the means whereby the lever may be swung comprises an electro-magnet on the said lever, said magnet, when energized, being attracted to the brake-drum and moved with it to swing the said lever.

14. A brake as set forth in claim 11 in which the lever has a hub and three arms, one of which projects from the hub between the ends of the brake-band and the other two of which diverge from the hub on opposite sides of the center plane of the drum through the pivot, an electro-magnet carried by the free ends of said diverging arms, and means whereby said magnet may be energized, said magnet having its pole faces in close proximity to the drum so that, when the magnet is energized, the drum serves as the armature thereof and the magnet is moved by the drum thus to swing the lever and expand the brake-band.

MORRIS BURR CHAMBERS.